United States Patent [19]
Warner et al.

[11] Patent Number: 5,257,413
[45] Date of Patent: Oct. 26, 1993

[54] OPTION SELECTION METHOD AND APPARATUS

[75] Inventors: Shawn A. Warner, Margate; Eric D. Brooks, Pompano Beach; Joseph Patino, Plantation, all of Fla.

[73] Assignee: Motorola, Inc., Schaumburg, Ill.

[21] Appl. No.: 774,425

[22] Filed: Oct. 10, 1991

[51] Int. Cl.⁵ ............................ H04B 1/38; H04B 1/20
[52] U.S. Cl. ...................................... 455/89; 455/68; 455/350; 379/447
[58] Field of Search ............... 455/89, 68, 350, 90; 379/58, 59, 61, 420, 430, 431, 432, 442, 447; 381/58, 59, 24, 25

[56] References Cited

U.S. PATENT DOCUMENTS 4,792,986  12/1988  Garner et al. ..................... 455/89
5,108,335   4/1992  Carey et al. ..................... 455/380

FOREIGN PATENT DOCUMENTS 2174578A  11/1986  United Kingdom ............... 379/420

Primary Examiner—Reinhard J. Eisenzopf
Assistant Examiner—Lisa Charouel
Attorney, Agent, or Firm—Michael J. Buchenhorner; Pedro P. Hernandez

[57] ABSTRACT

A radio circuit (10) provides for the selection of a mode of operation for the radio in response to sensing an external accessory (22, 22') including a speaker or an earpiece being connected to the radio circuit.

9 Claims, 2 Drawing Sheets

OPTION SELECTION METHOD AND APPARATUS

TECHNICAL FIELD

This invention relates generally to radio communications devices and more specifically to audio communications devices having connectors for external options.

BACKGROUND

Portable radios may include optional accessories such as external speakers or microphones. For convenience it is desirable for such portable radios to automatically adjust their mode of operation to the option connected to it. Typical connectors for external accessories include various pins for making the electrical connections between the portable radio and the accessory. Due to the limited space available in a portable radio the number of pins used for providing the required connections is limited. Therefore, a need exists for an option selection apparatus that uses the pins of the connector efficiently.

SUMMARY OF THE INVENTION

Briefly, according to the invention, a radio circuit provides for the selection of a mode of operation for the radio in response to sensing an external accessory being connected to the radio.

DETAILED DESCRIPTION OF THE PREFERRED EMBODIMENT

Figure 1:
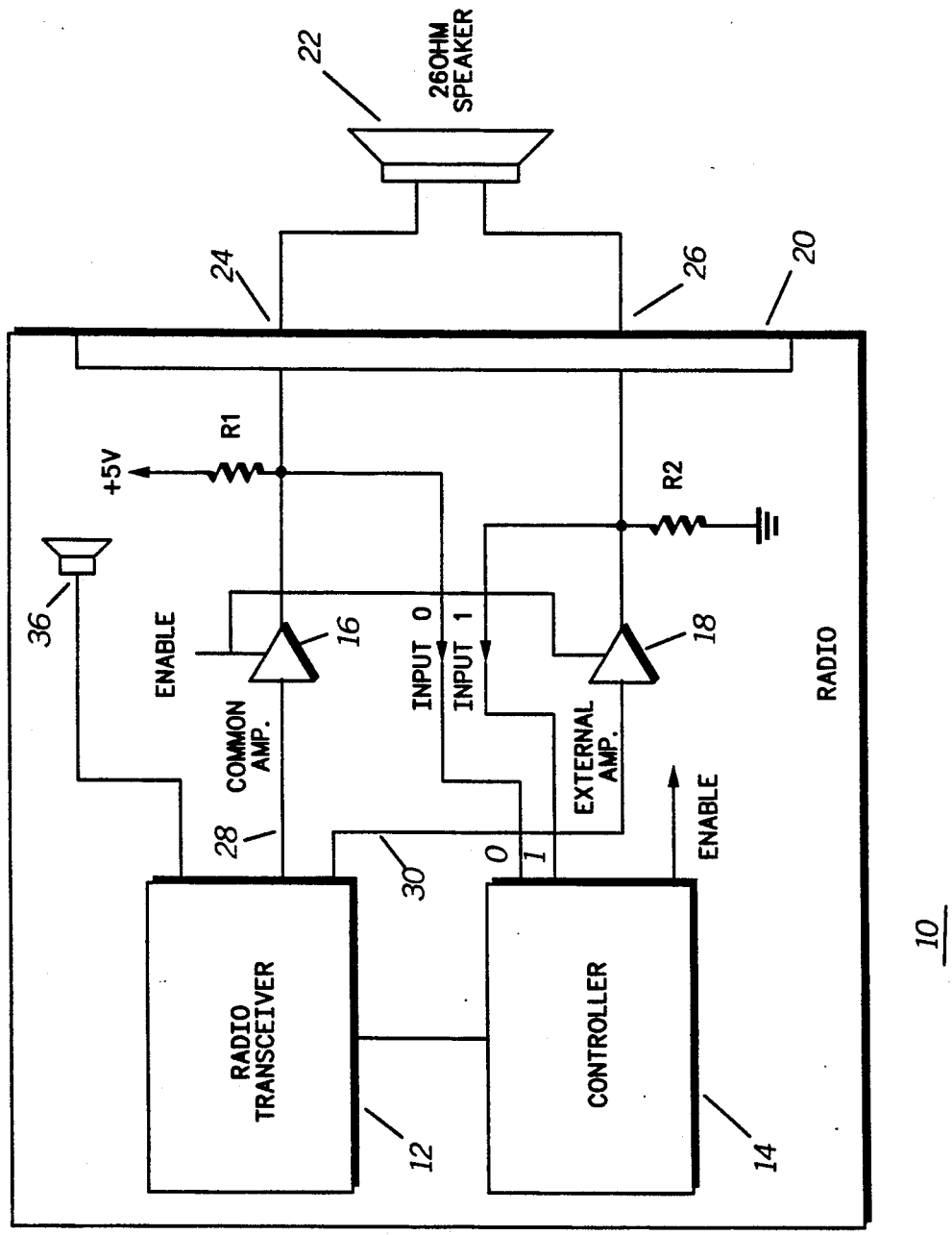
FIG. 1 shows a simplified schematic for a radio circuit that selects an option in response to the connection of an external speaker in accordance with the invention.

Referring to FIG. 1, there is shown a simplified schematic for a radio circuit 10 that selects an option in response to the connection of an external speaker in accordance with the invention. The radio circuit comprises a conventional radio transceiver 12 controlled by a controller 14 (preferably a conventional microprocessor), and a connector 20 for connection with an external speaker 22. The connector 20 includes at least two electrical contacts (i.e., pins) for providing the connection with the speaker 22. The radio transceiver 12 comprises a receiver portion, a transmitter portion and two audio outputs, 28 and 30 for providing an audio signal representing the radio signal received by the receiver portion. Output 28 is connected to a common amplifier 16, and output 30 is connected to an external amplifier 18. Amplifiers 16 and 18 amplify the output signals of the radio transceiver 12 to provide a balanced output to the speaker 22, via pins 24 and 26.

Speaker 22 is an optional external speaker that may be connected to the radio 10 via pins 24 and 26. It is desirable for the radio to adapt its mode of operation in response to the connection of the speaker 22 by deactivating an internal speaker 36, and providing the audio output through the pins 24 and 26.

Pin 24 is connected to supply voltage (5 volts) via a pull-up resistor, R1, and pin 26 is connected to ground potential via a resistor, R2. The resistor values should be sufficiently large to have no impact on the audio output level. Pin 24 is also connected to to a line 0 in controller 14, and pin 26 is also connected to a line 1 in controller 14. Amplifiers 16 and 18 each have enable inputs which are coupled to each other, and to an enable output in the controller 14. Lines 24 and 26, in addition to being used as speaker output lines, may be used as input sense lines 0 and 1, respectively. Therefore, the number of pins in the connector 20 is minimized by using the output lines as sensing inputs.

Operationally, when an accessory (such as the speaker 22) is connected to the radio 10, the speaker element within the accessory will cause a load to be placed on the speaker lines (24 and 26). When the controller 14 disables the audio amplifiers 16 and 18, the outputs assume a high impedance state. This allows for the following two cases. In the first case, the remote speaker/microphone 22 is connected to the radio 10 across pins 24 and 26. The remote speaker/microphone 22 has a typical resistance of 26 Ohms. This causes the input lines 0 and 1 to both read as logic "one" levels. The controller 14 is programmed to recognize this condition as indicative of the presence of an accessory that comprises a speaker. In response to this condition the controller enables the common amplifier 16 and the external amplifier 18, thus causing the audio output to be provided to the speaker 22. Simultaneously, the internal speaker 36 is disabled.

Figure 2:
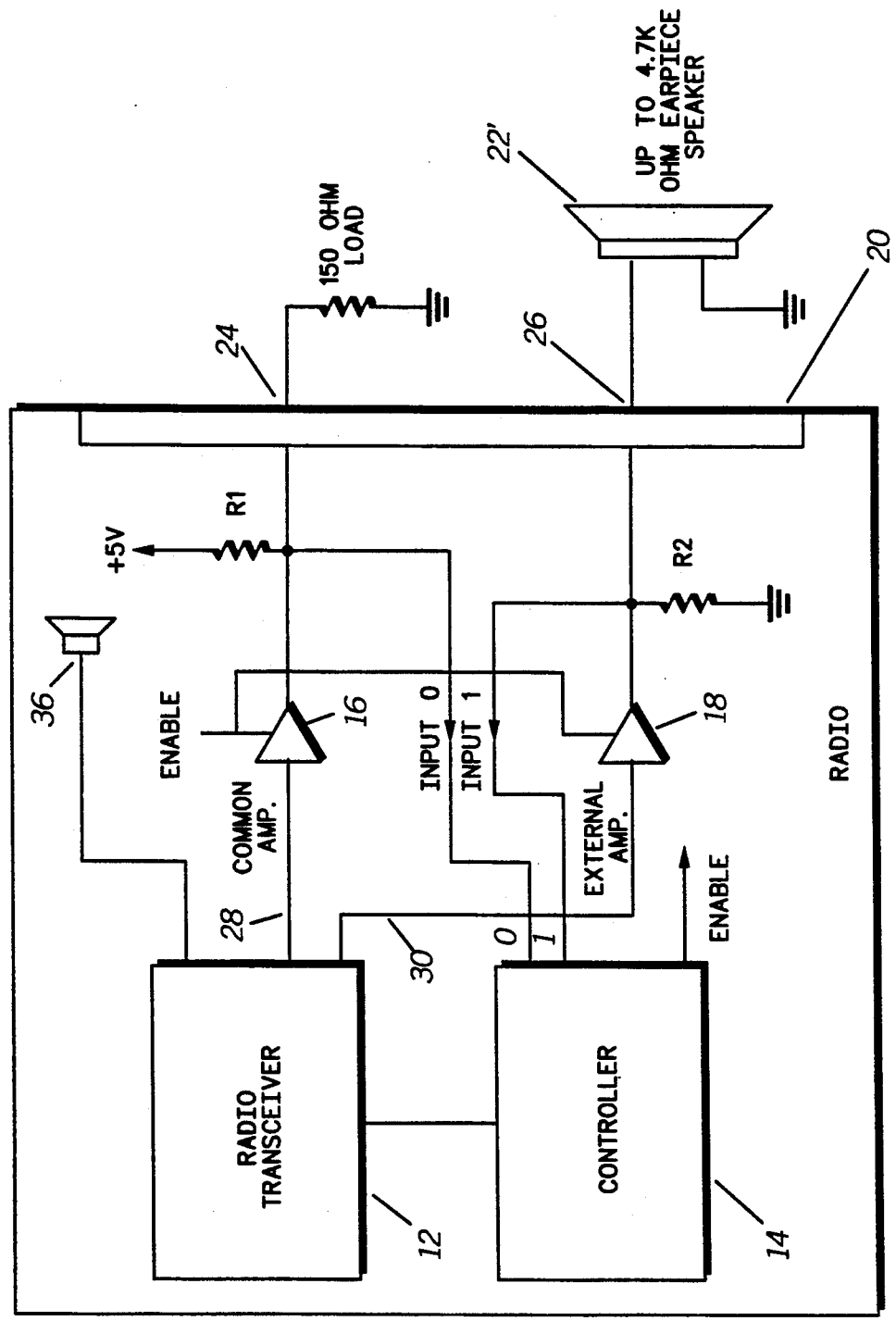
FIG. 2 shows a simplified schematic for a radio circuit that selects an option in response to the connection of an external earpiece speaker in accordance with the invention.

Referring to FIG. 2, in the second case the radio 10 is connected to a remote surveillance accessory 22' comprising an earpiece/speaker. The accessory 22' also comprises a 150 Ohm load for connection to the first terminal 24 of the connector 20. In this case, when the accessory 22' is connected to the radio 10 the speaker element is placed on the external amplifier line 26 to ground potential, and the 150 Ohm resistor is placed on the common amplifier line 24 to ground potential. Thus, inputs 0 and 1 both read 0 volts (a logic zero), indicating the presence of the accessory 22' to the controller 14.

When no accessory is connected to the radio 10, input 0 reads 5 volts and input 2 reads 0 volts. Therefore, the radio 10 can sense when an optional accessory, comprising,at a minimum, a speaker, is present by having the controller 14 sense the voltage at its inputs 0 and 1. The following chart summarizes the inputs to the controller 14, and the resulting states.

| Input 0 | Input 1 | State |
| --- | --- | --- |
| 0 | 0 | earpiece |
| 0 | 1 | not possible |
| 1 | 0 | no option |
| 1 | 1 | external speaker |

Thus, sensing the absence or presence of a speaker load to control the operation of the radio 10 eliminates the need for an option selection load that serves no other useful purpose. Additionally, by using pins 24 and 26 as both outputs and sensing inputs, the invention eliminates the need for additional connector pins.

What is claimed is:

1. A radio communication device having a connector comprising first and second terminals for connecting to an external optional accessory which includes a speaker, the radio communication device comprising:

receiver means for receiving radio signals, the receiver means comprising first and second outputs coupled to the first and second terminals, respectively, for providing an audio output signal representing the radio signals received by the receiver means; and controller means, coupled to the receiver means, for controlling the receiver means and for establishing at least one mode of operation for the radio communication device;

the controller means comprising first and second inputs coupled to the first and second terminals, respectively, for charging the at least one mode of operation for the radio communication device in response to sensing the external optional accessory being connected to at least one of the first and second terminals.

2. The radio communication device of claim 1 wherein the external optional accessory is an earpiece.

3. The radio communication device of claim 1 further comprising:

first amplifier means coupled between the first output and the first terminal; and second amplifier means coupled between the second output and the second terminal.

4. The radio communication device of claim 1 wherein the first terminal is for coupling to a supply voltage, and wherein the second terminal is for coupling to a ground voltage for establishing a logic high at the first and second terminals when the external optional accessory comprises an external speaker connected across the first and the second terminals, and for establishing a logic low at the first and second terminals when the external optional accessory comprises an earpiece connected to the second terminal.

5. The radio communication device of claim 1 further comprising:

a first resistor coupled to the first terminal for coupling the first terminal to a supply voltage; and a second resistor coupled to the second terminal for coupling the second terminal to ground.

6. The radio communication device of claim 5 further comprising:

first amplifier means coupled between the first output and the first terminal; and second amplifier means coupled between the second output and the second terminal.

7. The radio communication device of claim 3, wherein the first terminal is for coupling to a supply voltage, and wherein the second terminal is for coupling to a ground voltage for establishing a logic high at the first and second terminals when the external optional accessory comprises an external speaker connected across the first and the second terminals, and for establishing a logic low at the first and second terminals when the external optional accessory comprises an earpiece connected to the second terminal.

8. The radio communication device of claim 3, further comprising:

a first resistor coupled to the first terminal for coupling the first terminal to a supply voltage; and a second resistor coupled to the second terminal for coupling the second terminal to ground.

9. The radio communication device of claim 1, wherein the external optional accessory is an external speaker which receives the audio output signal.

* * * * *